(12) United States Patent
Bryant et al.

(10) Patent No.: US 7,852,751 B2
(45) Date of Patent: Dec. 14, 2010

(54) CONSTRUCTING REPAIR PATHS AROUND MULTIPLE NON-AVAILABLE LINKS IN A DATA COMMUNICATIONS NETWORK

(75) Inventors: Stewart Frederick Bryant, Green Park (GB); Ian Michael Charles Shand, Green Park (GB)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 12/032,274

(22) Filed: Feb. 15, 2008

(65) Prior Publication Data

US 2009/0207728 A1    Aug. 20, 2009

(51) Int. Cl.
*H04L 12/26*    (2006.01)
(52) U.S. Cl. .................................. 370/218; 370/395.32
(58) Field of Classification Search .................... None
See application file for complete search history.

(56) References Cited

U.S. PATENT DOCUMENTS

| | | | |
|---|---|---|---|
| 2005/0111349 | A1 | 5/2005 | Vasseur et al. |
| 2006/0187819 | A1 | 8/2006 | Bryant et al. |
| 2008/0062861 | A1 | 3/2008 | Shand |
| 2008/0101259 | A1 | 5/2008 | Bryant |
| 2008/0225697 | A1 | 9/2008 | Bryant |

FOREIGN PATENT DOCUMENTS

WO    2009/033601    8/2010

OTHER PUBLICATIONS

"Notification of Transmittal of the International Search Report and the Written Opinion of the International Searching Authority, or the Declaration" received in International application No. PCT/US2009/033601 (Apr. 9, 2009) 16 pages.
Current claims of International application No. PCT/US2009/033601 (Apr. 2009) 6 pages.

(Continued)

*Primary Examiner*—Kwang B. Yao
*Assistant Examiner*—Alex Skripnikov
(74) *Attorney, Agent, or Firm*—Hickman Palermo Truong & Becker LLP

(57) ABSTRACT

A data processing apparatus is configured for initiating a not-via approach for creating repair path information for a first link between the first network node and a second network node; creating a list of other network nodes that the not-via repair path traverses; creating and storing entries in the FIB identifying repair addresses for the network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to a not-via address that is normally reachable through the first link when the not-via address is in the list; repeating the preceding steps for all other links of the first network node.

33 Claims, 5 Drawing Sheets

OTHER PUBLICATIONS

Atlas, A. et al., "Basic Specification for IP Fast-Reroute: Loop-free Alternates draft-left-rtgwg-ipfrr-spec-base-06" *Network Working Group Internet-Draft* XP015049793 (Mar. 1, 2009) 14 pages.

Bryant, S. et al., "A Framework for Loop-free Convergence" *Network Working Group Internet-Draft* XP015051643 (Jun. 1, 2007) 12 pages.

Bryant, S. et al., "IP Fast Reroute Using Not-via Addresses" *Network Working Group Internet-Draft* XP015051639 (Jul. 1, 2007) 12 pages.

"Notification of Transmittal of the International Search Report and the Written Opinion of the International Searching Authority, or the Declaration" received in International application No. PCT/US2008/074547 mailed Dec. 12, 2008 (9 pages).

Atlas, A., "Basic Specification for IP Fast-Reroute: Loop-free Alternates: draft-ietf-rtgwg-ipfrr-spec-base-06.txt" XP015049793, IEFT Standard-Working-Draft, Internet Engineering Task Force (Mar. 1, 2007) 28 pages.

Bryant, S. et al., "IP Fast Reroute Using Not-via Addresses: draft-ietf-rtgwg-ipfrr-notvia-addresses-01.txt" XP015051639, IEFT Standard-Working-Draft, Internet Engineering Task Force (Jul. 1, 2007) 24 pages.

Xi, Kang, et al., IP Fast Rerouting for Double-Link Failure Recovery. Published by Polytechnic University [online]. Aug. 2006. Retrieved on [Sep. 23, 2008]. pp. 1-10. Retrieved from the Internet:<URL: http://eeweb.poly.edu/chao/docs/public/ipfrr_double.pdf>. Brooklyn, New York, USA.

Bryant Internet Draft M Shand S Previdi Cisco Systems S: "IP Fast Reroute Using Not-via Addresses; draft-ietf-rtgwg-ipfrr-notvia-addresses-01.txt" IETF Standard-Working-Draft, Internet Engineering Task Force, IETF, CH, vol. rtgwg, No. 1, Jul. 1, 2007, XP015051639 ISSN: 0000-0004.

Atlas A et al: "Basic Specification for IP Fast-Reroute: Loop-free Alternates; draft-ietf-rtgwg-ipfrr-spec-base-06.txt" IETF Standard-Working-Draft, Internet Engineering Task Force, IETF, CH, vol. rtgwg, No. 6, Mar. 1, 2007. XP015049793 ISSN: 0000-0004.

CONSTRUCTING REPAIR PATHS AROUND MULTIPLE NON-AVAILABLE LINKS IN A DATA COMMUNICATIONS NETWORK

FIELD OF THE INVENTION

The present disclosure generally relates to data communication networks. The invention relates more specifically to constructing repair paths around multiple non-available links in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. Based on the advertised information in the form of a link state packet (LSP) each node constructs a link state database (LSDB), for which a map of the entire network topology can be constructed, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

In normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated that induces creating a loop in the RIB or FIB. This can continue for as long as the loop remains although usually the packet will have a maximum hop count after which it will be discarded. Such a loop can be a direct loop between two nodes or an indirect loop around a circuit of nodes.

In some networks, two or more links are logically associated in a shared risk link group (SRLG). If a first link in an SRLG fails, all other links in the SRLG are considered to be failed as well, in determining a repair path around the first failed link.

IP fast re-routing (IPFRR) is an initiative in the Internet Engineering Task Force to develop techniques for rapidly constructing repair paths around a failed link, a failed node, or a predictable failure of an SRLG. However, known solutions do not provide protection against the failure of multiple links at approximately the same time where the links are not members of a known SRLG. A particular problem in this context is that the repair for one of the links may attempt to traverse the second failure. If the repair for that failure happens to traverse the first link, then a looping repair path results, which cannot deliver the packets to their destination. To avoid this problem, known not-via IPFRR approaches specifically forbid the repair of an already repaired packet in order to prevent such loops. However, this constraint only reduces the collateral damage caused by the loop, and does not of itself allow the packet to be delivered to its destination.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
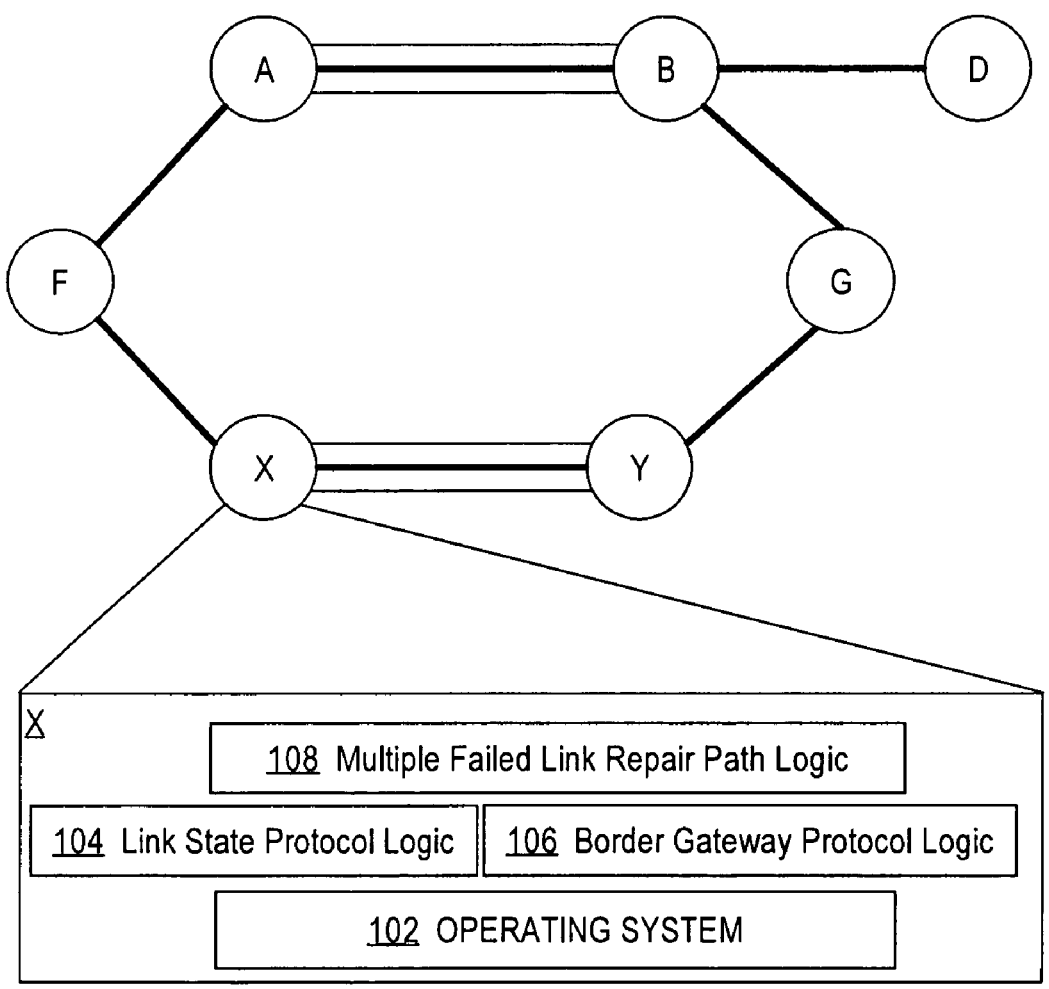
FIG. 1 illustrates a network.

A method and apparatus for constructing a repair path around a non-available component in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

The needs identified in the foregoing Background, and other needs and objects that will become apparent for the following description, are achieved in the present invention, which comprises, in one aspect, a data processing apparatus operable in a network as a first network node and comprising one or more processors; a network interface communicatively coupled to the one or more processors and configured to communicate one or more packet flows among the one or more processors in the network; memory coupled to the processors and comprising a forwarding information base (FIB) for a routing protocol; logic coupled to the one or more processors and comprising one or more stored sequences of instructions which, when executed by one or more processors, cause the one or more processors to perform: initiating a not-via approach for creating and storing repair path information for a first link between the first network node and a second network node; creating and storing a list of other network nodes that the not-via repair path traverses; creating and storing entries in the FIB identifying repair addresses for the network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to a not-via address that is normally reachable through the first link when the not-via address is in the list; repeating the preceding steps for all other links of the first network node.

Embodiments are capable of constructing one or more repair paths around multiple non-available links in a data communications network.

In an embodiment, the logic further comprises instructions which when executed cause the one or more processors to perform: determining from entries in the FIB one or more pairs of mutually incompatible link failures; advertising the one or more pairs as secondary shared risk link groups, using the routing protocol.

In an embodiment, the logic further comprises instructions which when executed cause sending network traffic destined for a repair address via a corresponding repair path.

In an embodiment, the logic further comprises instructions which when executed cause: determining that a simultaneous failure of the first link and a second link has occurred; determining that a first repair path for the first link traverses the second link, and that a second repair path for the second link traverses the first link; determining that a packet drop count is greater than a specified threshold value, that a hold-down step is in use with respect to re-convergence, and that a loop-free convergence mechanism is in use; in response to the ultimate determining step, sending an "Abandon All Hope" notification to logic implementing the routing protocol for forcing normal re-convergence to begin.

In an embodiment, the logic further comprises instructions which when executed cause: receiving, from a second node, a border gateway protocol (BGP) advertisement of a first not-via address with a path vector; determining a list of links for a repair path to the received not-via address; receiving one or more other BGP advertisements of other not-via addresses with path vectors; determining that a repair path for a link is mutually looping, based on the path vectors; inserting in the FIB a drop repair entry for the first not-via address.

In an embodiment, the first network node comprises a neighbor node, acting as a repairing node, and the logic further comprises instructions which when executed cause the repairing node to identify, for a destination address of the second network node, a repair address as an encapsulation repair endpoint for a repair to the destination address in the event of non-availability of the second network node.

In an embodiment, the network includes multi-homed prefixes and the logic further comprises instructions which when executed cause determining if an attachment point to a multi-homed prefix is reachable without a repair path and encapsulating a packet to the attachment point if so; and if an attachment point to the multi-homed prefix is only reachable via a repair path, encapsulating traffic to the corresponding repair address.

In an embodiment, the routing protocol is any of a link state routing protocol, MPLS routing protocol or distance vector routing protocol.

In an embodiment, the first link is in a shared risk link group.

In an embodiment, the logic further comprises instructions which when executed cause decapsulating the packets at a preceding node to one of the repair addresses. In an embodiment, the packets comprise multi-cast traffic.

In other aspects, the invention encompasses a computer-implemented method and a computer-readable medium configured to implement the functions described herein.

2.0 Structural and Functional Overview 2.1 Repair of Multiple Unrelated Link Failures Using not-Via A method and apparatus for constructing a repair path around a non-available component in a data communications network, using a "not-via" approach, is described in U.S. Patent Application Publication No. 20060187819, authored by the inventors named in this patent document. In the not-via approach of Publication No. 20060187819, in addition to the standard addresses assigned to each node, each interface in the network is assigned an additional repair address termed the "not-via address." A packet addressed to a not-via address must be delivered to the router with that address not via the component implied by the not-via address; for example, not via the neighboring router on the interface to which that address is assigned. To repair a failure, a repairing node encapsulates the packet to the not-via address of the node interface on the far side of the failure. The nodes on the repair path then know to which node they must deliver the packet, and which network component they must avoid.

The description herein assumes an understanding of Publication No. 20060187819. In particular, the present document describes certain improvements to the approaches of Publication No. 20060187819, but does not repeat information that is already known in Publication No. 20060187819. The entire contents of Publication No. 20060187819 are hereby incorporated by reference for all purposes as if fully set forth herein.

FIG. 1 is a diagram of a hypothetical network comprising nodes A, B, D, G, F, X, Y. For purposes of illustrating a clear example, seven nodes are shown in FIG. 1, but the techniques herein may be applied in any network of any size. Each node comprises a computing element such as a router or switch. Each of the nodes comprises a processor, a switching system, memory, and other hardware elements as further described herein for FIG. 5. Each of the nodes further comprises stored program control logic in the form of firmware, hardware, software, or a combination thereof that can implement the functions described herein.

In an embodiment, each of the nodes A, B, D, G, F, X, Y comprises the functional units shown for node X in FIG. 1. In an embodiment, a node comprises an operating system 102, such as Cisco IOS Software from Cisco Systems, Inc., San Jose, Calif. The operating system 102 may host or control applications such as link state protocol logic 104, which implements a link state routing protocol, and may optionally host border control protocol (BGP) logic 106, which implements BGP, such as BGPv4 as defined in Internet Engineering Task Force (IETF) Request for Comments (RFC) 1771 and related RFCs. In an embodiment, a node further comprises multiple failed link repair path logic 108, which comprises firmware, hardware, software, or a combination thereof that can implement the functions described herein for FIG. 2, FIG. 3, and the functions described in other sections hereof. In an embodiment, the multiple failed link repair path logic 108 may be integrated into the link state protocol logic 104 or operating system 102. Aspects of certain functions described herein may be implemented in BGP logic 106. Further, all elements of node X shown in FIG. 1 may be integrated into a single unit of software, firmware, or a combination and separate blocks are shown in FIG. 1 solely to illustrate a clear example.

Links in FIG. 1 are described herein by connectivity to nodes; for example, link A-B is coupled to node A and node B. Links A-B and X-Y are protected, and all repairs are performed as not-via repairs according to the techniques of Publication No. 20060187819. Loop-free alternate (LFA) or downstream routes are also possible, and are discussed in other sections herein.

In the context of FIG. 1, three possible repair path scenarios may occur when two links fail at the same time:

1. The repair path for link A-B does not traverse link X-Y, and the repair path for link X-Y does not traverse link A-B. This case will not cause looping or packet loss.

2. The repair path for A-B traverses X-Y, but the repair path for X-Y does not traverse A-B. In a conventional not-via repair path approach, in operation, the repaired packet for failed link A-B would be dropped when it reached failed link X-Y, since repairs of repaired packets are forbidden in the approach of Publication No. 20060187819. However, if this packet were allowed to be repaired upon reaching X-Y, then no harm would be done, other than the possibility of double encapsulation that could cause the repaired packet to exceed the allowable maximum transmission unit (MTU) of the routing protocol. The effect of exceeding MTU is addressed in a subsequent section herein.

3. The repair for A-B traverses X-Y and the repair for X-Y traverses A-B. In this case, an unrestricted repair would result in packets looping in the network continuously with increasing levels of encapsulation. This behavior is undesirable and potentially harmful to the network.

In an embodiment, the multiple failed link repair path logic 108 in a node is configured to identify which of these cases exists, and to perform a not-via repair in a manner that achieves loop avoidance. For purposes of illustrating clear examples, FIG. 1 shows only nodes A, B, D, G, Y, X, and F, but the hypothetical network of FIG. 1 may include many other nodes and links that enable constructing effective repair paths around a mutual link failure of A-B and X-Y.

Figure 2:
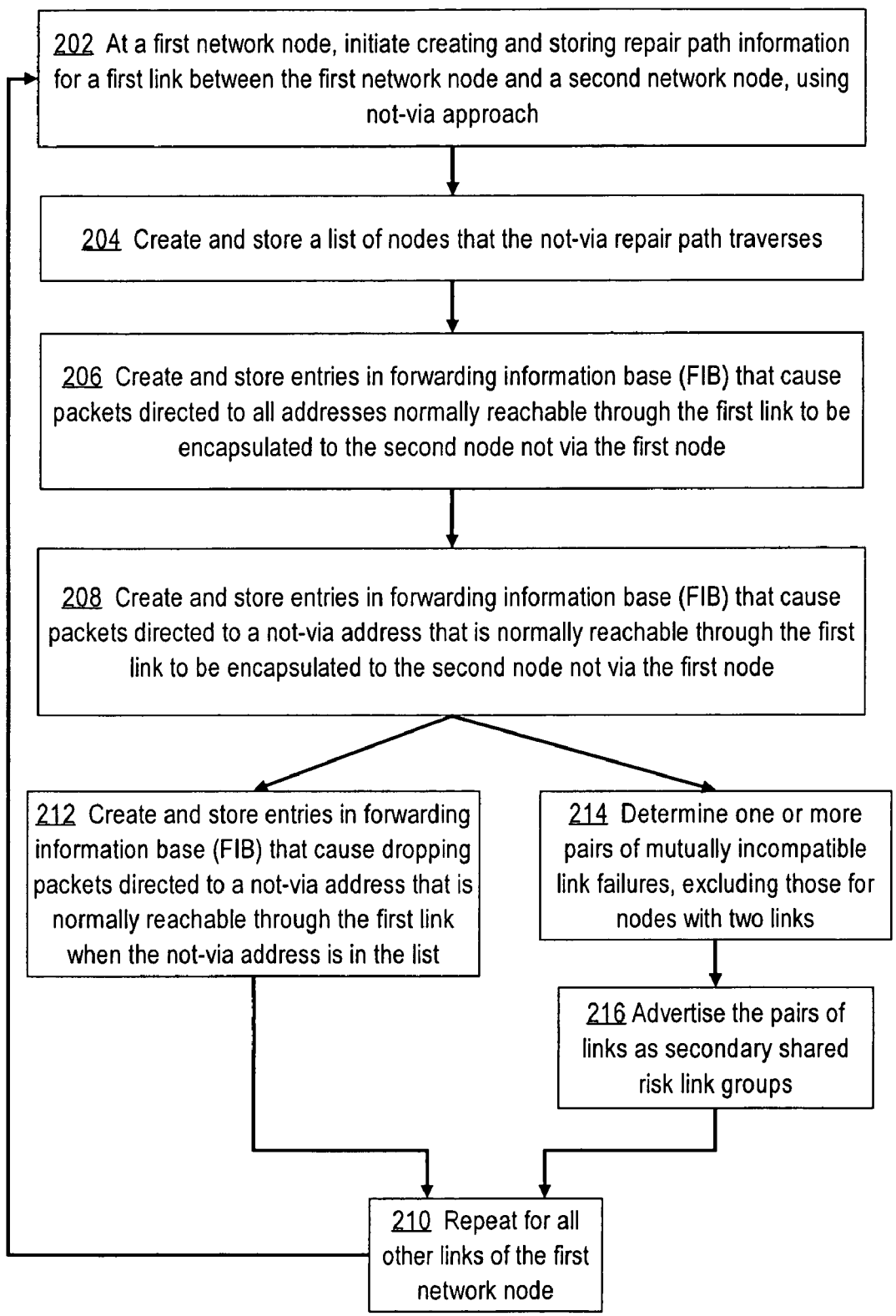
FIG. 2 is a flow diagram of a process of constructing repair paths for use when multiple links in a data communications network fail simultaneously.

FIG. 2 is a flow diagram of a process of constructing repair paths for use when multiple links in a data communications network fail simultaneously.

In step 202, a first network node initiates creating and storing repair path information for a first link between the first network node and a second network node, using a not-via approach. For example, node A pre-computes a not-via repair path for link A-B, using the approach of Publication No. 20060187819. When node A is computing a not-via repair path for A-B, such as a path for traffic addressed to Ba, which is read as "B not-via A," node A is aware of the list of nodes which this path traverses. The list of nodes can be recorded during the SPF process, and the not-via addresses associated with each forward link can be determined. Referring again to FIG. 1, if the path is A, F, X, Y, G, B, then the list of not-via addresses is: Fa, Xf, Yx, Gy, Bg.

In step 204, a list of nodes that the not-via repair path traverses is created and stored. Storage, in step 204, may comprise transient storage in memory during the SPF process.

Under standard not-via operation as described in Publication No. 20060187819, A populates its forwarding information base (FIB) so that all addresses normally reachable via A-B are encapsulated to Ba when A-B fails, but all traffic to not-via addresses is dropped. According to an embodiment, any traffic for a not-via address normally reachable over A-B is also encapsulated to Ba unless the not-via address is one of those previously identified as on the path to Ba, for example Yx, in which case the packet is dropped.

Accordingly, as shown in steps 206, 208, and 212, the node creates and stores entries in its forwarding information base (FIB) that cause packets directed to all addresses normally reachable through the first links to be encapsulated to the second node not via the first node (step 206). The node also creates and stores FIB entries that cause packets directed to a not-via address that is normally reachable through the first link to be encapsulated to the second node not via the first node (step 208). At step 212 the node further creates and stores FIB entries that cause dropping packets directed to a not-via address that is normally reachable through the first link when the not-via address is in the list that was created at step 204. The preceding steps are repeated for all other links of the repairing node.

This approach allows performing a repair in all three cases identified above, while preventing a loop from occurring in the third case. In an embodiment, all required FIB entries are pre-computed, and therefore the approach does not require any detailed packet inspection. Nodes other than a repairing node simply forward packets based on FIB entries using conventional routing protocol operations; special repair markers, repair level indicators, counters, or other mechanisms are not necessary.

The present approach permits benign repairs to coexist, although in some cases the approach results in multiple encapsulations. Significant performance issues do not arise, because the two encapsulations or two decapsulations are normally performed at different nodes. The only potential issue is exceeding the allowed maximum transmission unit (MTU) in the network resulting from an increase in packet size due to multiple encapsulations.

However, in the third case, although the potentially looping traffic is dropped, the traffic is not repaired. If a hold-down step is applied before re-convergence, in case the link failure was just a short glitch, and if a loop-free convergence mechanism (such as ordered FIB convergence logic) further delays convergence, then the traffic will be dropped for an extended period. In an embodiment, additionally or as an alternative to the approach herein described in sections 2.2, special action is taken in response to expiration of a time-to-live value in a not-via packet. For example, in the looping scenarios described thus far, in the absence of special steps to drop looping not-via packets, a looping not-via packet will eventually result in expiration of a time-to-live value in the not-via packet when the not-via packet is not delivered to a destination node in time. In an embodiment, in these circumstances an "abandon all hope" (AAH) action is taken (or a message is sent within the routing protocol logic) to immediately invoke normal re-convergence. Under these circumstances, it is not sufficient to expedite the issuance of an LSP reporting the failure, since this may be treated as a permitted simultaneous failure by ordered FIB convergence logic; instead, it is necessary to trigger an AAH message to induce normal convergence. An ordered FIB AAH action can be triggered when a packet drop count on the not-via address has been incremented.

Figure 3:
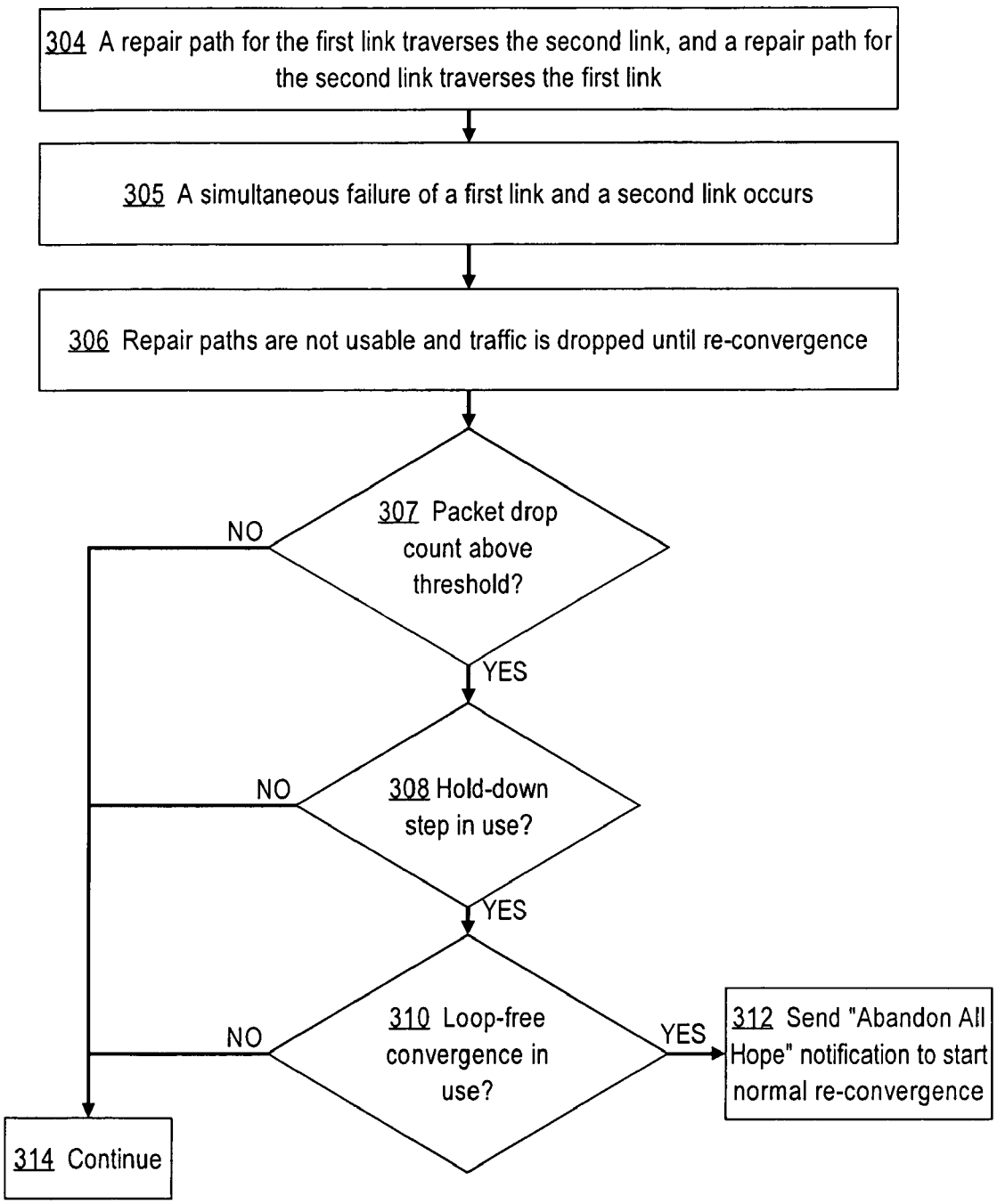
FIG. 3 is a flow diagram of a process of dropping traffic and triggering convergence when multiple links in a data communications network fail simultaneously.

This approach is illustrated in FIG. 3. FIG. 3 is a flow diagram of a process of dropping traffic and triggering convergence when multiple links in a data communications network fail simultaneously. In step 304, a node has determined that a repair path for the first link traverses the second link, and a repair path for the second link traverses the first link, by pre-computing the repair paths as described above for FIG. 2. In step 305, a simultaneous failure of a first link and a second link occurs. This is the third scenario described above. As a result, the repair paths are not usable and certain traffic directed to addresses reachable over the links will be dropped until re-convergence occurs.

In an embodiment, in step 307, a node tests whether the packet drop count maintained in the node has exceeded a specified threshold. Such a test is performed to promptly detect whether traffic actually flowing is resulting in unacceptable packet loss and therefore is probably on mutually looping repair paths, and results in remedial action as soon as possible by invoking the AAH approach. This alternative has the benefit of resolving loops within the time required to traverse 256 hops, plus the time required to "back out" a repair so that any other node can break future loops.

A packet drop count is conventionally maintained by operating system 102 of a node and is accessible through an API call or a database lookup within the node. If the threshold has been exceeded, then the node checks whether a hold-down step is in use at step 308. Step 308 may be implemented in logic that does not actually perform a test but merely branches because the writer of the logic is aware that hold-down logic has been implemented. If a hold-down step is in use, then at step 310 the logic tests whether a loop-free convergence process is in use in the node. If so, then an "Abandon All Hope" notification is triggered, to discontinue the hold-down period and to force normal re-convergence. As a result of convergence, new network paths may be discovered that can allow the traffic to be forwarded rather than dropped. If any of the tests of steps 307, 308, 310 are false, processing continues at step 314.

Alternatively, the logic can wait until the LSP describing the change is issued normally, for example, when X announces the failure of X-Y. When the repairing node, which has pre-computed that X-Y failures are mutually incompatible with its own repairs, receives this LSP, then the repairing node can issue the AAH. This alternative approach has the disadvantage that it does not overcome the hold-down delay. However, the alternative approach requires no data-driven operation, and still has the required effect of abandoning the ordered FIB convergence process, which is probably the longer of the delays.

2.2 Secondary Shared Risk Link Groups

To address the third scenario, in an alternative embodiment, an alternative SRLG-like repair path is computed, rather than simply dropping the offending packets. In such an alternative approach, the mutually incompatible failures are identified and advertised as secondary SRLGs. Such links are then failed together when computing the repair paths for the affected not-via addresses, but not for normal addresses.

Referring again to FIG. 2, in the alternative approach, at step 214, after performing steps 202, 204, 206, 208, the node determines one or more pairs of mutually incompatible link failures, excluding those for nodes with two links. In step 216, the pairs of links are advertised as secondary shared risk link groups. This effectively removes the pairs of links from consideration, together, when the repair paths for affected not-via addresses are determined.

The general approach of FIG. 2, steps 202 to 212 to identify which not-via addresses should be dropped is conservative as an indicator of mutually incompatible failures, because some of the addresses dropped may never be used for a repair. While this issue does not arise in the example of FIG. 1, the approach of steps 214-216 can be used for other scenarios, and is conservative and only invokes SRLG computation when the repair paths are mutually incompatible.

For example, when node A has identified that the normal path for Yx is over A-B, so that the Yx packet should be dropped, node A performs a further check by running the SPF algorithm, rooted at X with X-Y removed, to determine if A-B is indeed on X's repair path for Yx. A-B may not be on that repair path, even though packets for Yx would traverse A-B because the complete sink tree is computed for Yx.

In an embodiment, the further check calculation appears to be order hk, where h is the average hop length of repair paths and k is the average number of neighbors of a router, but certain optimizations may be introduced. When A is computing a set of repair paths, A computes repair paths for all its k neighbors. For each neighbor, A determines a list of node pairs that are traversed by each repair path. Each list of node pairs may have one or more node pairs in common, so the actual number of link failures that require investigation is the union of the lists of node pairs. Node A then runs an SPF rooted at the first node of each pair—the first node is the root because the pairings are ordered representing the direction of the path—with the link to the second node removed. This SPF, while not an incremental, can be terminated as soon as the not-via address is reached.

For example, when running the SPF rooted at X, with the link X-Y removed, the SPF can be terminated when Yx is reached, and the resulting path is put into PATHS; it is a fundamental property of the SPF algorithm that once a node is placed in PATHS, the shortest path to it has been found. Once the path has been found, the path is checked to determine if it traverses any of A's links. Because the node pair XY may exist in the list for more than one of A's links, so that the node pair XY lies on more than one repair path, it is necessary to identify the correct list and link that has a mutually looping repair path. The identified link of A is then advertised by A as a secondary SRLG paired with the link X-Y. Because node X also will be running the same algorithm, node X will identify that XY is paired with AB and will so advertise it.

In an embodiment, a cross-check may be performed to verify the accurateness of the calculation. The ordering of the pairs in the lists is important. For example, the link XY and the link YX are considered separately.

If and only if the repairs are mutually incompatible, then the pair of links is advertised as a secondary SRLG. All nodes then compute repair paths around both failures, using an additional not-via address Ba|(x-y), meaning B not-via A or the link X-Y.

Most mutually looping repair paths are caused by nodes with only two links, or sections of a network that are only bi-connected. In these cases, repair is clearly impossible; the failure of both links partitions the network. In an embodiment, such cases are identified to inhibit the fruitless advertisement of the secondary SRLG information. In an embodiment, identification is performed by a node that detects the requirement for a secondary SRLG first running the not-via computation with both links removed. If this process does not result in a path, then the network would be partitioned by such a failure, and therefore no advertisement is required or made.

Thus, in the approach herein each node performs a small amount of extra computation and then possibly advertises some secondary SRLG information, which then causes other nodes to re-compute their repair paths based on this information. An alternative approach is for all nodes to perform the computation on behalf of other nodes. This approach is possible because a node executing a link state protocol has access to full topology information within the relevant flooding scope of the routing domain. In this alternative, no additional flooding or "two phase" computation is required.

Figure 4:
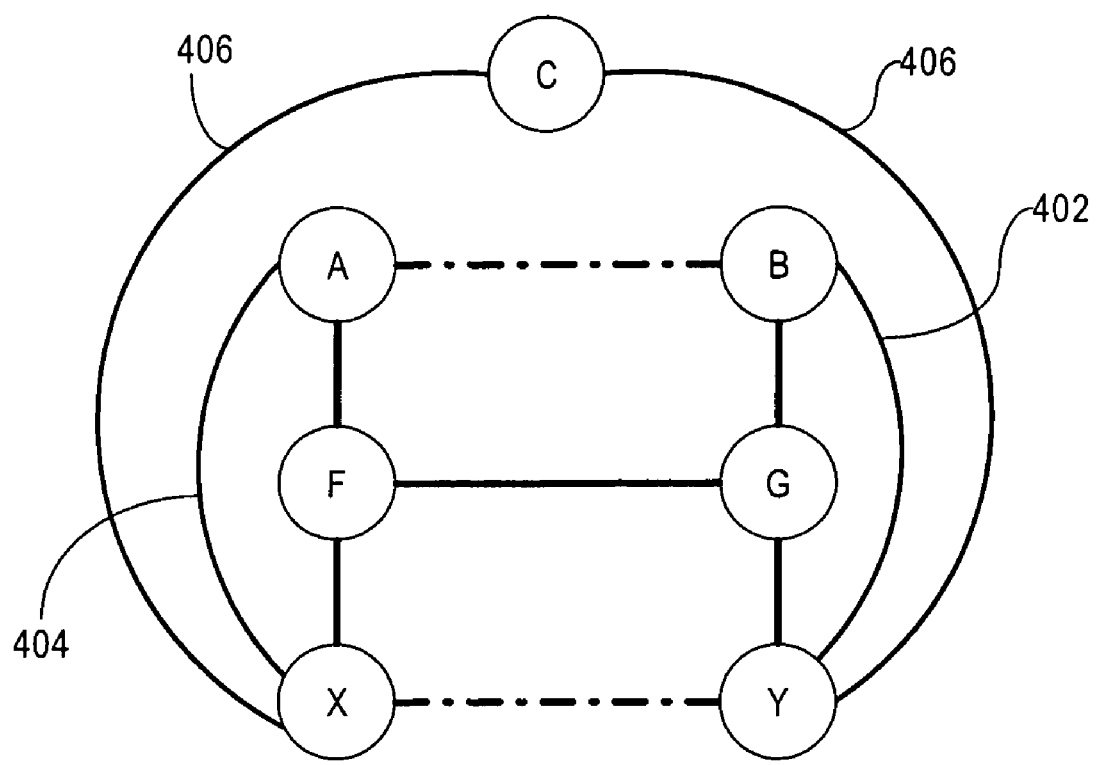
FIG. 4 illustrates a network having mutually looping repair paths.

In an alternative embodiment, the SRLG approach herein also may be used to determine repair paths in network topologies in which multiple concurrent link failures result in multi-way loops. FIG. 4 illustrates a network topology in which multiple concurrent link failures result in a multi-way loop. A network comprises nodes A, B, F, G, X, Y, and C having links A-B, A-E, B-G, G-F, G-Y, X-Y, X-F, X-C, and C-Y. Corresponding links in the opposite direction are not enumerated herein for simplicity. Node A has computed A-X (404) as a repair path around A-B. Node B has computed B-Y (402) as a repair path around B-A. Node X has computed X-C-Y (406) as a repair path around X-Y. Node Y has computed Y-C-X as a repair path around Y-X. In this arrangement, when A-B and X-Y mutually fail, an infinite loop arises along the repair paths and the unaffected paths between the nodes in the interior of the topology. Further, placing A-B and X-Y in a secondary SRLG as described thus far is insufficient to remove the loop.

In an embodiment, multi-way loops caused by multiple mutual link failures may be addressed by extending the method of checking paths by running additional SPF calculations. In particular, a repairing node additionally determines another level of repair paths by performing an SPF rooted at each node that is known to be on a previously determined repair path. The repairing node also includes, in the list of nodes created at step 204 of FIG. 2 and used to install drop FIB entries at step 212 of the process of FIG. 2, all nodes on the additional repair paths if the repair paths include the repairing node.

In general, to address loops caused by mutual failure of three (3) links, the approach performs two levels of SPF calculations in addition to the original not-via computation. When four (4) links are involved, three levels are explored, and so forth. The process may repeat using recursive exploration to any number of desired levels, balanced against the availability of memory, processing resources, and time to perform the entire pre-computation. Further, when ever higher numbers of failures are considered in this process, the likelihood increases that actual failures would partition the network in a way that would prevent effective forwarding until at least one link repair is effected.

Additionally, the routing protocol logic may implement the "Abandon All Hope" process described above, in response to expiration of a TTL value, when a loop arises when N+1 links have mutually failed and repair paths have been computed as stated above only for N links. Thus, the "Abandon All Hope" approach can serve as a safety net and can balance against the cost of performing a large number of levels of SPF calculations.

As a result, loop protection is extended to three or more links by installing additional drop entries that will cause packets to be dropped, rather than to continuously loop, when a multi-way mutual loop is recognized.

2.3 Loop Free Alternates and Downstream Routes

The preceding description has assumed that all repairs are not-via tunnels. However, embodiments may use loop free alternates (LFAs) or downstream routes where available. The use of LFAs or downstream routes complicates the approach herein because such use results in packets that are being repaired, but that are not addressed to not-via addresses.

If both links that have failed are using downstream routes, then there is no possibility of looping, since it is impossible to have a pair of nodes which are both downstream of each other. However, loops can occur when LFAs are used. An example is the well-known node repair problem with LFAs.

If one link is using a downstream route, while the other is using a not-via tunnel, the approach will work if the nodes on the path of the downstream route can be determined. Some methods of computing downstream routes do not provide this information. If information about the nodes on the path of the downstream route is available, then the link using a downstream route will have a discard FIB entry for the not-via address of the other link. Consequently, potentially looping packets will be discarded when they attempt to cross this link. Unlike the case in which two failed links use not-via repairs, in which the loop will be broken when a not-via packet first meets the second failure, the downstream routed packet will be repaired unconditionally, and the downstream routed packet will only be dropped when that packet is routed back to the first failure. That is, the downstream routed packet will execute a single turn of the loop before being dropped.

Further, with downstream routes, the path may be computed to the far side of the failure, but the packet may "peel off" to its destination before reaching the far side of the failure. In this case the packet may traverse some other link which has failed and was not accounted for on the computed path. For example, if the A-B repair is a downstream route and the X-Y repair is a not-via repair, then the X-Y repair packets encapsulated to $Y_X$ follow a path that attempts to traverse A-B. If the A-B repair path for "normal" addresses is a downstream route, it cannot be assumed that the repair path for packets addressed to $Y_X$ can be sent to the same neighbor. This is because the validity of a downstream route must be ascertained in the topology represented by $Y_X$, which is with the link X-Y failed. This topology is not the same as that used for the normal downstream calculation, and use of the normal downstream route for the encapsulated packets may result in an undetected loop.

If it is computationally feasible to check the downstream route in this topology (in an embodiment, for any not-via address $Q_P$ which traverses A-B, a node performs the downstream calculation for that not-via address in the topology with Q-P failed), then the downstream repair for $Y_X$ can safely be used. These packets cannot re-visit X-Y, since by definition such packets will avoid that link.

Alternatively, such packets can be repaired in a not-via tunnel. For example, even though the normal repair for traffic traversing A-B would be to use a downstream route, an embodiment may require that such traffic addressed to a not-via address must use a tunnel to $B_A$, by installing such a tunnel as a route for traffic addressed to the not-via address. Such a tunnel would only be installed for an address $Q_P$ if it were established that it did not traverse Q-P, using the rules described above.

In any of the foregoing embodiments, routing protocol type-length-value (TLV) elements may be used to advertise the repair paths that are constructed or to advertise paths to avoid. Additionally or alternatively, advertisements may specify that nodes need to construct a not-via repair path around specified links. For example, an advertisement could announce the need to construct a not-via repair path around a list of one or more links that are named, identified by endpoint nodes, or otherwise identified. As another example, such an advertisement could additionally include one possible repair path, in which case a receiving node could determine that the receiving node is on that repair path and therefore the receiving node should perform a calculation of another repair path. As yet another example, such an advertisement could trigger a receiving node to enter a specified repair path in its FIB, effectively forcing a receiving node to update its routing table in a specified way.

3.0 Implementation Mechanisms—Hardware Overview

Figure 5:
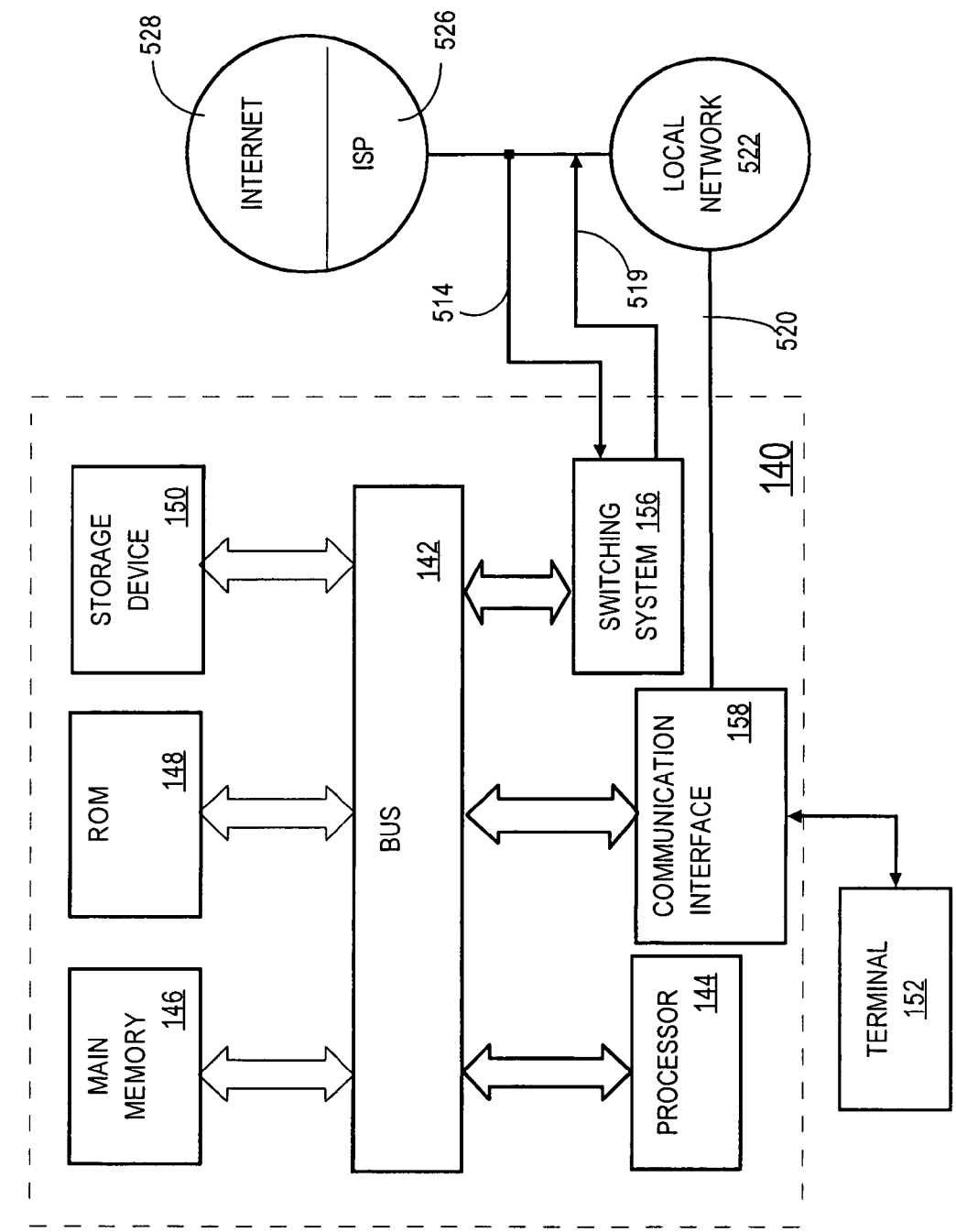
FIG. 5 is a block diagram that illustrates a computer system upon which a method for constructing a repair path may be implemented.

FIG. 5 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system. Link 520 may couple communication interface 158 to a local network 522.

A switching system 156 is coupled to bus 142 and has an input interface 514 and a respective output interface 519 to external network elements. The external network elements may include a plurality of additional routers or a local network 522 coupled to one or more hosts or routers, or a global network such as the Internet having one or more servers. The switching system 156 switches information traffic arriving on the input interface to the output interface according to predetermined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a participating node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 519 also may provide a two-way data communication coupling to a network link that is connected to a local network. For example, the interface 519 may be an integrated services digital network (ISDN) card or a modem to provide a data communication connection to a corresponding type of telephone line. As another example, the interface 519 may be a local area network (LAN) card to provide a data communication connection to a compatible LAN. Wireless links may also be implemented. In any such implementation, the interface 519 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP) 526. The ISP 526 in turn provides data communication services through the world wide packet data communication network now commonly referred to as the "Internet" 528. The local network and the Internet both use electrical, electromagnetic or optical signals that carry digital data streams. The signals through the various networks and the signals on the network link and through the interface 519, which carry the digital data to and from computer system 140, are exemplary forms of carrier waves transporting the information.

Computer system 140 can send messages and receive data, including program code, through the network(s), network link and interface 519. In the Internet example, a server might transmit a requested code for an application program through the Internet, ISP, local network and communication interface. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

What is claimed is:

1. An apparatus comprising:
   one or more processors;
   a network interface communicatively coupled to the one or more processors and configured to communicate one or more packet flows among the one or more processors in a network;
   memory coupled to the processors and comprising a forwarding information base (FIB) for a routing protocol;
   logic operable in a network as a network node and coupled to the one or more processors and comprising one or more stored sequences of instructions which, when executed by the one or more processors, cause the one or more processors to perform:
   while each node and each link in the network are operational:
      initiating a not-via approach for creating and storing repair path information for a first link between a first network node and a second network node;
      creating and storing a list of not-via-first-link-repair-path-network nodes that form a not-via-first-link-repair path from the first network node to the second network node;
      wherein the not-via-first-link-repair path traverses the not-via-first-link-repair-path-network nodes;
      wherein the not-via-first-link-repair path does not traverse the first link between the first network node and the second network node;
      creating and storing entries in the FIB identifying repair addresses for network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to the not-via address that is normally reachable through the first link when the not-via address is in the list;
      repeating the initiating, creating and storing the list and creating and storing entries for all other links of the network node.

2. The apparatus of claim 1, wherein the logic further comprises instructions which when executed cause the one or more processors to perform: determining from entries in the FIB one or more pairs of mutually incompatible link failures; advertising the one or more pairs as secondary shared risk link groups, using the routing protocol.

3. The apparatus of claim 2, wherein the logic further comprises instructions which when executed cause the one or more processors to perform determining, for each neighbor node, a list of node pairs that are traversed by each repair path; performing a shortest path first (SPF) calculation rooted at a first node of each pair with a link to the second node removed; determining whether a resulting path includes the first link.

4. The apparatus of claim 1 wherein the logic further comprises instructions which when executed cause sending network traffic destined for a repair address via a corresponding repair path.

5. The apparatus of claim 1 wherein the logic further comprises instructions which when executed cause:
   determining that a simultaneous failure of the first link and a second link has occurred;
   determining that a first repair path for the first link traverses the second link, and that a second repair path for the second link traverses the first link;
   determining that a packet drop count is greater than a specified threshold value, that a hold-down step is in use with respect to re-convergence, and that a loop-free convergence mechanism is in use;
   in response to the ultimate determining step, sending an "Abandon All Hope" notification to logic implementing the routing protocol for forcing normal re-convergence to begin.

6. The apparatus of claim 1 in which the network comprises a neighbor node neighboring to the first network node, acting as a repairing node, and wherein the logic further comprises instructions which when executed cause the repairing node to identify, for a destination address of the second network node, a repair address as an encapsulation repair endpoint for a repair to the destination address in the event of non-availability of the second network node.

7. The apparatus of claim 1 wherein the network includes multi-homed prefixes and wherein the logic further comprises instructions which when executed cause determining if an attachment point to a multi-homed prefix is reachable without a repair path and encapsulating a packet to the attachment point if so; and if an attachment point to the multi-homed prefix is only reachable via a repair path, encapsulating traffic to a corresponding repair address.

8. The apparatus of claim 1 wherein the routing protocol is any of a link state routing protocol, MPLS routing protocol or distance vector routing protocol.

9. The apparatus of claim 1, wherein the first link is in a shared risk link group.

10. The apparatus of claim 1 wherein the logic further comprises instructions which when executed cause decapsulating packets at a preceding node to one of the repair addresses.

11. The apparatus of claim 1 wherein packets comprise multi-cast traffic.

12. The apparatus of claim 1, comprising any of a packet data router, or a switch for a packet-switched network.

13. The apparatus of claim 1, wherein the logic further comprises instructions which when executed cause:
   determining one or more additional repair paths by performing a shortest path first (SPF) calculation rooted at each of the other nodes in the list;
   creating and storing entries in the FIB that cause dropping packets directed to not-via addresses that are in the one or more additional repair paths if the first network node is in the one or more additional repair paths.

14. The apparatus of claim 13, wherein the logic further comprises instructions which when executed cause the one or more processors to perform:
   for each of the one or more additional repair paths, recursively repeating:

determining one or more new additional repair paths by performing the SPF calculation rooted at each of the other nodes in the list;
creating and storing entries in the FIB that cause dropping packets directed to not-via addresses that are in the one or more new additional repair paths if the first network node is in the one or more new additional repair paths.

15. A non-transitory computer readable volatile or non-volatile storage medium storing one or more stored sequences of instructions which, when executed by one or more processors of a network node in a network, cause the one or more processors to perform:
while each node and each link in the network are operational:
initiating a not-via approach for creating and storing repair path information for a first link between a first network node and a second network node;
creating and storing a list of not-via-first-link-repair-path-network nodes that form a not-via-first-link-repair path from the first network node to the second network node;
wherein the not-via-first-link-repair path traverses the not-via-first-link-repair-path-network nodes;
wherein the not-via-first-link-repair path does not traverse the first link between the first network node and the second network node;
creating and storing entries in a forwarding information base (FIB) for a routing protocol that identify repair addresses for network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to the not-via address that is normally reachable through the first link when the not-via address is in the list;
repeating the initiating, creating and storing the list and creating and storing entries for all other links of the network node.

16. The computer-readable storage medium of claim 15, further comprising instructions which when executed cause the one or more processors to perform:
determining from entries in the FIB one or more pairs of mutually incompatible link failures;
advertising the one or more pairs as secondary shared risk link groups, using the routing protocol.

17. The computer-readable storage medium of claim 15 further comprising instructions which when executed cause sending network traffic destined for a repair address via a corresponding repair path.

18. The computer-readable storage medium of claim 15 further comprising instructions which when executed cause:
determining that a simultaneous failure of the first link and a second link has occurred;
determining that a first repair path for the first link traverses the second link, and that a second repair path for the second link traverses the first link;
determining that a packet drop count is greater than a specified threshold value, that a hold-down step is in use with respect to re-convergence, and that a loop-free convergence mechanism is in use;
in response to the ultimate determining step, sending an "Abandon All Hope" notification to logic implementing the routing protocol for forcing normal re-convergence to begin.

19. The computer readable storage medium of claim 15, further comprising instructions which when executed cause the one or more processors to perform determining, for each neighbor node, a list of node pairs that are traversed by each repair path; performing a shortest path first (SPF) calculation rooted at a first node of each pair with a link to the second node removed; determining whether a resulting path includes the first link.

20. The computer-readable storage medium of claim 15 in which the network comprises a neighbor node neighboring to the first network node, acting as a repairing node, and further comprising instructions which when executed cause the repairing node to identify, for a destination address of the second network node, a repair address as an encapsulation repair endpoint for a repair to the destination address in the event of non-availability of the second network node.

21. The computer-readable storage medium of claim 15 wherein the network includes multi-homed prefixes and further comprising instructions which when executed cause determining if an attachment point to a multi-homed prefix is reachable without a repair path and encapsulating a packet to the attachment point if so; and if an attachment point to the multi-homed prefix is only reachable via a repair path, encapsulating traffic to a corresponding repair address.

22. The computer-readable storage medium of claim 15 wherein the routing protocol is any of a link state routing protocol, MPLS routing protocol or distance vector routing protocol.

23. The computer-readable storage medium of claim 15, wherein the first link is in a shared risk link group.

24. The computer readable storage medium of claim 15, further comprising instructions which when executed cause the one or more processors to perform:
determining one or more additional repair paths by performing a shortest path first (SPF) calculation rooted at each of the other nodes in the list; creating and storing entries in the FIB that cause dropping packets directed to not-via addresses that are in the one or more additional repair paths if the first network node is in the one or more additional repair paths.

25. The computer readable storage medium of claim 24, further comprising instructions which when executed cause the one or more processors to perform:
for each of the one or more additional repair paths, recursively repeating:
determining one or more new additional repair paths by performing the SPF calculation rooted at each of the other nodes in the list;
creating and storing entries in the FIB that cause dropping packets directed to not-via addresses that are in the one or more new additional repair paths if the first network node is in the one or more new additional repair paths.

26. A computer-implemented method, comprising:
while each node and each link in a network are operational:
initiating a not-via approach for creating and storing repair path information for a first link between a first network node and a second network node;
creating and storing a list of not-via-first-link-repair-path-network nodes that form a not-via-first-link-repair path from the first network node to the second network node;
wherein the not-via-first-link-repair path traverses the not-via-first-link-repair-path-network nodes;
wherein the not-via-first-link-repair path does not traverse the first link between the first network node and the second network node;

creating and storing entries in a forwarding information base (FIB) identifying repair addresses for network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to the not-via address that is normally reachable through the first link when the not-via address is in the list;

repeating the initiating, creating and storing the list and creating and storing entries for all other links;

wherein the method is performed by one or more processors.

27. The method of claim 26, further comprising determining from entries in the FIB one or more pairs of mutually incompatible link failures; advertising the one or more pairs as secondary shared risk link groups, using the routing protocol.

28. The method of claim 27, further comprising determining, for each neighbor node, a list of node pairs that are traversed by each repair path; performing a shortest path first (SPF) calculation rooted at a first node of each pair with a link to the second node removed; determining whether a resulting path includes the first link.

29. The method of claim 26, further comprising:
determining that a simultaneous failure of the first link and a second link has occurred;
determining that a first repair path for the first link traverses the second link, and that a second repair path for the second link traverses the first link;
determining that a packet drop count is greater than a specified threshold value, that a hold-down step is in use with respect to re-convergence, and that a loop-free convergence mechanism is in use;
in response to the ultimate determining step, sending an "Abandon All Hope" notification to logic implementing the routing protocol for forcing normal re-convergence to begin.

30. An apparatus, comprising:
one or more processors performing the steps while each node and each link in a network are operational:
initiating a not-via approach for creating and storing repair path information for a first link between a first network node and a second network node;
creating and storing a list of not-via-first-link-repair-path-network nodes that form a not-via-first-link-repair path from the first network node to the second network node;
wherein the not-via-first-link-repair path traverses the not-via-first-link-repair-path-network nodes;
wherein the not-via-first-link-repair path does not traverse the first link between the first network node and the second network node;
creating and storing entries in a forwarding information base (FIB) identifying repair addresses for network nodes and that cause (a) packets directed to all addresses normally reachable through the first link to be encapsulated to the second node not via the first node, (b) packets directed to a not-via address that is normally reachable through the first link to be encapsulated to the second node not via the first node, and (c) dropping packets directed to the not-via address that is normally reachable through the first link when the not-via address is in the list;
repeating initiating, creating and storing the list and creating and storing entries for all other links.

31. The apparatus of claim 30, further comprising determining from entries in the FIB one or more pairs of mutually incompatible link failures;
advertising the one or more pairs as secondary shared risk link groups, using the routing protocol.

32. The apparatus of claim 31, further comprising determining, for each neighbor node, a list of node pairs that are traversed by each repair path; performing a shortest path first (SPF) calculation rooted at a first node of each pair with a link to the second node removed; determining whether a resulting path includes the first link.

33. The apparatus of claim 30, further comprising:
determining that a simultaneous failure of the first link and a second link has occurred;
determining that a first repair path for the first link traverses the second link, and that a second repair path for the second link traverses the first link;
determining that a packet drop count is greater than a specified threshold value, that a hold-down step is in use with respect to re-convergence, and that a loop-free convergence mechanism is in use;
sending, in response to the ultimate determining means, an "Abandon All Hope" notification to logic implementing the routing protocol for forcing normal re-convergence to begin.

* * * * *